Aug. 6, 1940. M. O. TEETOR 2,210,310
PISTON FOR INTERNAL COMBUSTION ENGINES AND THE LIKE
Filed April 22, 1939 2 Sheets-Sheet 1
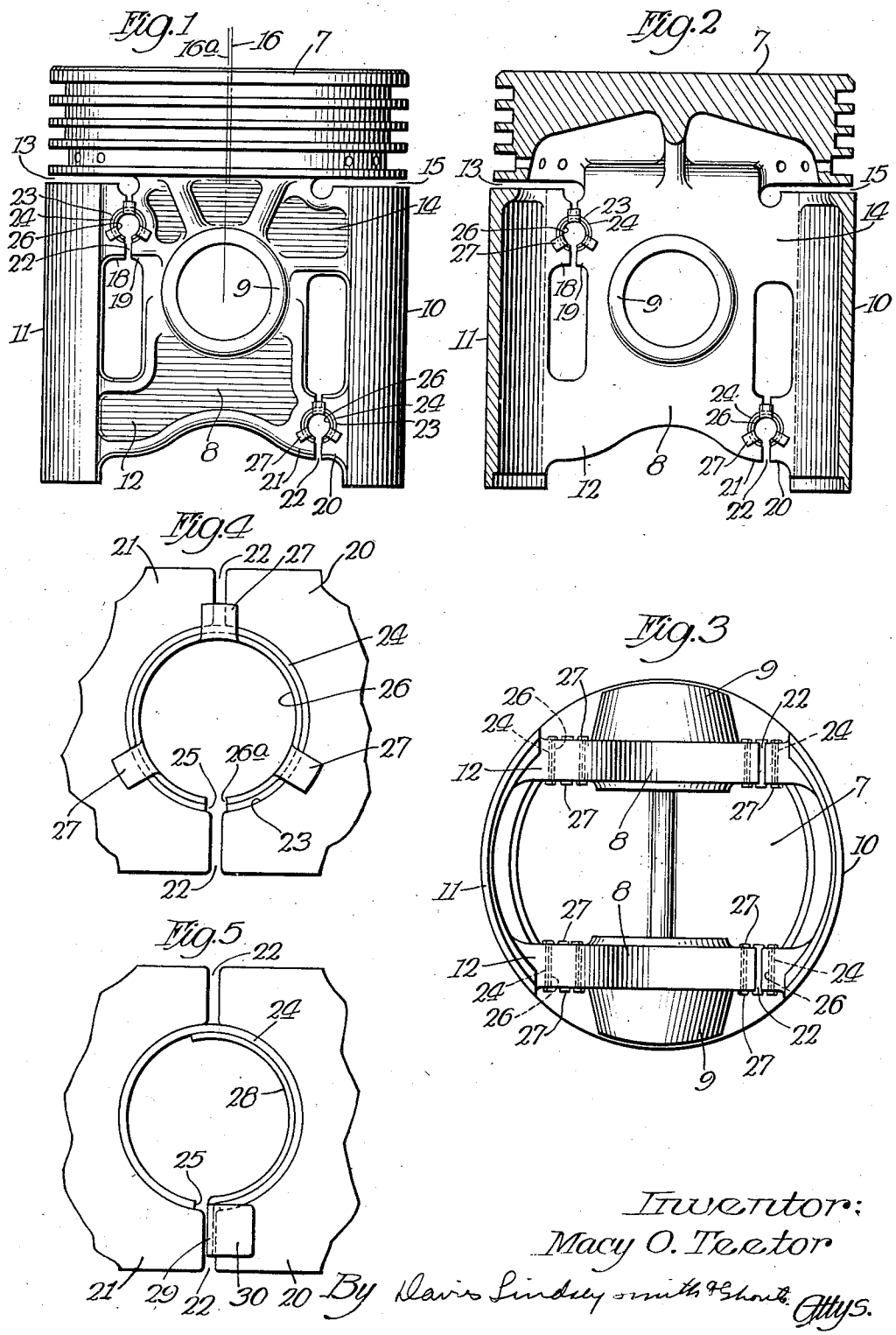
Inventor:
Macy O. Teetor
By Davis Lindsey Smith & Shonts Attys.

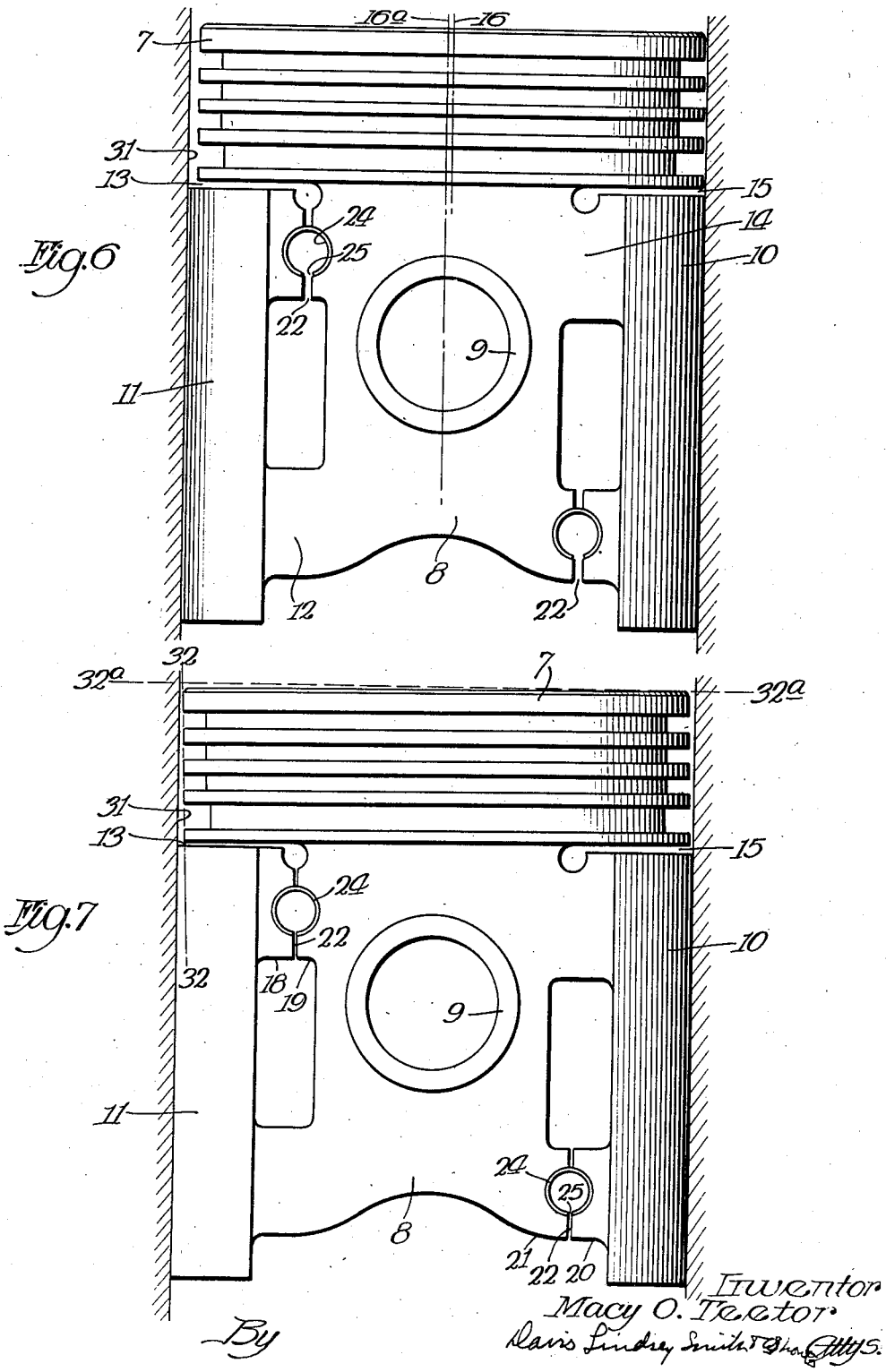

Patented Aug. 6, 1940

2,210,310

UNITED STATES PATENT OFFICE 2,210,310

PISTON FOR INTERNAL COMBUSTION ENGINES AND THE LIKE

Macy O. Teetor, Newcastle, Ind., assignor to Perfect Circle Company, Hagerstown, Ind., a corporation of Indiana Application April 22, 1939, Serial No. 269,376

14 Claims. (Cl. 309—11)

This invention relates to pistons for internal combustion engines and the like, such as disclosed in my copending application Serial No. 175,220, filed November 18, 1937, of which this application is a continuation-in-part.

One of the principal objects of my invention is to provide a piston so constructed that the desired clearances between the bearing faces and the cylinder wall may be maintained throughout the operating range of the engine regardless of temperature without danger of scuffing or seizure while at the same time the piston will not fit the cylinder so loosely as to cause piston slap. More particularly, I provide a piston which has two rigid bearing shoes, one connected only at its lower end and the other only at its upper end, the connections and action being such that the above-mentioned desired clearances are maintained and objectionable defects present in aluminum pistons of the slotted skirt type now on the market are overcome.

Another important object of my invention is to provide novel means including springs, for maintaining the desired diameter of the shoes when the engine is cold and preventing "collapse" under all operating conditions.

The above and further objects of my invention will appear more fully from the following description, reference being had to the accompanying drawings in which:

Figure 1 is a side elevation of a piston embodying the preferred form of my invention;

Fig. 2 is a vertical section through the axis of the piston;

Fig. 3 is a bottom plan view of the piston;

Fig. 4 is an enlarged fragmentary side view showing the spring means and retaining means therefor in place;

Fig. 5 is a view similar to Fig. 4 but showing a modified form of holding means for the spring means;

Fig. 6 is a diagrammatic or schematic illustration showing in an exaggerated way the relative positions of the head, hangers, shoes and cylinder wall when the engine is "cold"; and Fig. 7 is the same as Fig. 6 except that it shows in an exaggerated way the relative positions of such parts when the engine is "hot."

Referring to Figs. 1, 2, 3, 6 and 7, depending from the head 7 of the piston are two hangers 8 carrying the piston pin bosses 9. On opposite sides of the piston are bearing shoes 10 and 11, the shoe 10 being on the thrust side of the piston. Each shoe is rigid throughout, having no appreciable flexing characteristic either lengthwise or circumferentially. The shoe 11 is connected adjacent its lower end to extension portions or arms 12 of the hangers. The upper end of the shoe 11 is separated from the head by a slot 13.

The bearing shoe 10 is connected adjacent its upper end to extension portions or arms 14 of the hangers and the upper end of this shoe is separated from the head by a slot 15.

The vertical axis of the head, as indicated by the broken line numbered 16 in Figs. 1 and 6, is slightly off-center, say .004", toward the shoe 10 with respect to the vertical axis of the shoes, indicated by the broken line 16ª. In other words, the axis of the head is slightly nearer the bearing face of the thrust shoe 10 than it is to the bearing face of the shoe 11.

The upper part of the shoe 11 carries inwardly projecting portions 18, the inner ends of which face the outer ends of outwardly projecting portions 19 on the hangers 8. Likewise, the lower part of the shoe 10 carries inwardly projecting portions 20, the inner ends of which face the outer ends of outwardly projecting portions 21 on the hangers 8. When the piston is cast the projections 18 and 19 and the projections 20 and 21 are integrally joined and form struts in effect. The struts are drilled to form round holes or openings 23 and then the struts are cut to form slots 22, above and below the openings. I preferably grind the piston to the proper dimensions before the struts are drilled and cut. Mounted in the holes 23 are tempered spring sleeves 24 slotted axially as at 25 (Fig. 4). Positioned in each sleeve 24 is a retaining sleeve 26 formed of softer spring material and having a slot 26ª. Each sleeve 26 is provided at its opposite ends with tab-like projections 27 which, after the sleeves 24 and 26 are inserted in their respective openings, are bent outwardly at a 90° angle against the sides of the projections 18 and 19 or 20 and 21 in order to prevent axial displacement of the sleeves 24 and 26.

In Fig. 5 a modified form of retaining means for each sleeve 24 is illustrated. The retaining spring member 28 is semi-cylindrical and has a flange 29 projecting into one of the slots 22. Tab-like projections 30 at the opposite ends of the flange are bent at right angles to the flange to lock the sleeve 24 and member 28 against displacement.

The operation and action of the piston may be most conveniently explained by reference to the diagrammatic views (Figs. 6 and 7).

The bearing faces of the rigid shoes 10 and 11 are parallel to each other and this relationship is maintained throughout the operating range of the engine. When the engine is cold the shoes are also parallel to the axis of the skirt, this axis being indicated by the broken line 16ᵃ, and the axis of the head, indicated by the broken line 16, is likewise parallel to the axis 16ᵃ. In operation of the engine heat is conducted from the head to the hangers and thence to the bearing shoes. More heat passes to the thrust shoe 10 than the shoe 11 as the former is connected to the hangers nearer the head than is the latter. The heat causes thermal expansion of the aluminum alloy forming the hangers, shoes and head. Due to this thermal expansion the lateral elongation of the hangers within their plane tends to move the shoes further apart, that is, to increase the skirt diameter, and the slight increase in the thickness of the shoes because of the thermal expansion also tends to move the bearing faces of the shoes further apart. The shoes, however, remain throughout their length in constant contact with the cylinder wall (indicated at 31) which confines the shoes and prevents them from being moved further apart when the metal expands. In other words, the diameter of the skirt, formed by the shoes, remains substantially constant throughout the entire range of operation of the engine regardless of the temperatures. However, as the thermal expansion takes place the slots 22 tend to close against the action or resistance of the spring sleeves 24 and this condition of the piston is illustrated somewhat diagrammatically in Fig. 7. The shoes being confined by reason of the cylinder wall the hangers and head must necessarily tilt or cock, toward the left with respect to the shoes and cylinder wall. In Fig. 7 the broken line 32ᵃ—32ᵃ indicates the horizontal plane in which the top surface of the head lies when the engine is cold, and the broken line 32—32 indicates the inclination of the head in cocked position in relation to the vertical cylinder wall.

To accommodate the tilting movement of the head and hangers relative to the shoes, which are rigid and do not flex or bend, the arms 12 and 14 while rigid lengthwise, are relatively rigid against bending, yet sufficiently yielding or flexible vertically to permit of this relative tilting movement. In other words, while the action is rather difficult to understand and describe, I am of the opinion that the arms 12 and 14 serve somewhat the function of rather rigid hinges which in themselves tend to resist the relative swinging or tilting movement between the shoes and hangers. I have demonstrated by actual use and tests of pistons embodying my invention that they are more efficient than those now in common commercial use and that they are long-lived and not subject to breakage.

The spring sleeves 24, before being inserted in the holes 23, have a diameter larger than the holes so that, when they are placed in the holes, they exert an outward spring pressure on the upper end of the shoe 11 and the lower end of the shoe 10. This pressure is such on a 3″ piston as to normally expand the free piston skirt diameter approximately .0005″. This original expansion prevents the piston from "slapping" when the engine is "cold." As the temperature of the engine increases, the material of the piston expands due to the heat and as the shoes are in engagement with the cylinder wall the slots 22 decrease in width and the spring sleeves 24 are compressed. At the maximum operating temperature, the slots 26ᵃ in the sleeves 26 are not entirely closed. However, when the load and speed are such that excessive thrust is exerted and the piston tends to collapse, the slots 26ᵃ may be such as to momentarily close. The slots 25 in the sleeves 24 are preferably of such width that these slots do not close, even momentarily. However the reverse condition may be present, as the slot 26ᵃ may be such that it will not close even momentarily whereas the slot 25 may close momentarily. The spring sleeves 24 afford a snubbing or braking action or effect because as the sleeves are compressed their tension is increased and their outer peripheries frictionally slide on the surfaces forming the holes 23 and the sleeves 26 working within the sleeves 24 supplement the snubbing action of the sleeves 24. This snubbing action is quite helpful or beneficial in tending to prevent the momentary collapse of the piston and the closing of the spring sleeves. In certain instances, the thrust pressure exerted at the upper end of the shoe 11 may be somewhat greater than that exerted on the lower end of the shoe 10, and, to produce a balanced action in such cases, a stronger spring sleeve, if desired, may be employed at the upper end of shoe 11. If the reverse condition should exist then the spring at the lower end of the shoe 10 may be stronger than the spring at the upper end of the shoe 11.

The head of the piston has sufficient clearance so that it will not engage the cylinder wall. As expansion takes place the shoes, as explained above, remain in substantial parallelism but the hangers and head tilt slightly and because of the greater clearance at the side of the head above the shoe 11, the upper corner of the head is prevented from striking and scoring the cylinder wall. Furthermore, as the upper end of the shoe 10 is connected to the hangers adjacent the head and the upper end of the shoe 11 is free, except for the spring sleeve 24, the expansion of the head at right angles to the axis of the pin bosses takes place for the most part away from the thrust side of the piston. For this reason also there is greater clearance at the head above the shoe 11 than on the opposite side above the shoe 10.

It is understood that my invention is not limited to the details of construction shown and that other forms may be used without departing from the scope of my invention.

I claim:

1. In a piston, a head, hanger means depending from and within said head, rigid bearing shoes on opposite sides of said piston, one of said shoes being connected on its inner side and interiorly of its bearing face and at its lower end to said hanger means with its upper end separated from said head by a slot, and the other shoe being connected on its inner side and interiorly of its bearing face and at its upper end to said hanger means with its lower end separated from the hangers.

2. In a piston, a head, hanger means depending from said head and including shoe-supporting arms, piston pin bosses carried by said hanger means, a rigid bearing shoe on one side of said piston and between said bosses, and mounted on its inner side and interiorly of its bearing face and at its lower end to said arms and being separated at its upper end from the hangers, said arms being substantially rigid but adapted to permit relative tilting movement between the shoe and hanger means, and a second rigid bearing shoe on the opposite side of the piston and between said bosses, said second shoe being mounted on its inner side and interiorly of its bearing face and at its upper end and being separated at its lower end from the hangers.

3. In a piston adapted for use in the cylinder of an internal combustion engine, a head, hangers depending from said head, piston pin bosses carried by said hangers, bearing shoes on opposite sides of said piston, one of said shoes being connected on its inner side and interiorly of its bearing face and only adjacent its upper end to said hangers and the other shoe being connected on its inner side and interiorly of its bearing face and only adjacent its lower end to said hangers and the head and hangers being adapted to tilt relative to the shoes and the axis of the head being nearer the outer face of the shoe connected adjacent its upper end than it is to the outer face of the other shoe so that the side of the head having the greatest normal clearance with the cylinder wall will not engage the latter when the head tilts.

4. In a piston adapted for use in a cylinder of an internal combustion engine, a head, hangers depending from said head, piston pin bosses carried by said hangers, bearing shoes on opposite sides of the piston, one of said shoes being integrally connected on its inner side and interiorly of its bearing face and adjacent its upper end to said hangers with said upper end separated from said head by a slot and with the lower end of said shoe separated from the hangers, the other shoe being integrally connected on its inner side and interiorly of its bearing face and adjacent its lower end to said hangers with the upper end of the shoe separated from the head by a slot, the integral connections between the shoes and hangers being substantially rigid but adapted to permit the hangers and head to tilt with respect to the shoes upon thermal expansion of the material forming the piston during operation of the engine, and the vertical axis of the head being off-center toward said shoe connected at its upper end with respect to the vertical plane in which the horizontal axis of the bosses lies to prevent one side of the head from engaging the cylinder wall during operation of the engine.

5. In a piston adapted for use in a cylinder of an internal combustion engine, means comprising a head and hangers, piston pin bosses carried by said hangers, and two shoes on opposite sides of the piston, the shoe on the thrust side being connected on its inner side and interiorly of its bearing face and only at its upper end to said means and the other shoe being connected on its inner side and interiorly of its bearing face and only at its lower end to said means, the shoes being adapted to constantly remain in substantial parallelism and said means being adapted to tilt with respect to the shoes upon thermal expansion of the material forming the piston during operation of the engine and the side of the head above the shoe connected at its lower end being sufficiently inset with respect to the face of said shoe to prevent the side of the head remote from the thrust shoe from engaging the cylinder wall during operation of the engine.

6. In a piston, a head, a skirt including a bearing portion supported at its lower end and having its upper end free to permit relative tilting movement between the head and bearing portion, means including a spring for exerting outward pressure on the upper end of said bearing portion and adapted to control said relative tilting movement, and a second spring for snubbing the action of the first spring.

7. In a piston, a head, hanger means depending from said head, bearing shoes on opposite sides of said piston, one of said shoes being connected at its lower end to said hanger means with its upper end free and separated from said head by a slot, and the other shoe being mounted at its upper end with its lower end free, spring means for exerting outward pressure on the free ends of the shoes, and additional spring means for supplementing the action of the first spring means and also snubbing said action.

8. In a piston adapted for use in a cylinder of an internal combustion engine, a head, hanger means depending from said head, bearing shoes on opposite sides of said piston, one of said shoes being integrally connected at its lower end to said hanger means with its upper end separated from said head by a slot, and the other shoe being rigidly mounted at its upper end with its lower end free, means including springs for exerting outward pressure on the free ends of said shoes, the clearance between cylinder wall and the side of the head above the shoe connected to its lower end being greater than the clearance at the opposite side of the head and additional springs for supplementing the spring action of said first mentioned spring and also snubbing said action.

9. In a piston, a head, hanger means depending from said head, a bearing shoe integrally connected at one end to said hanger means and free at its opposite end, means between the free ends of said shoe and hanger means and having a hole, and a spring sleeve mounted in said hole for exerting outward spring pressure against the free end of the shoe and having frictional engagement with the surface forming the hole to afford a snubbing action.

10. In a piston, a head, means depending from the head, bearing shoes on opposite sides of said piston, one of said shoes being connected at its lower end to said means with its upper end free, the other shoe being connected with the upper end of said means with its lower end free, means within the piston having holes adjacent the free ends of the shoes, and spring sleeves mounted in the holes for exerting outward pressure against the free ends of the shoes and having frictional engagement with the surfaces forming holes to afford a snubbing action.

11. In a piston, a head, hanger means depending from said head and including shoe-supporting arms, piston pin bosses carried by said hanger means, a bearing shoe on one side of said piston and between said bosses, said bearing shoe being mounted on its inner side and interiorly of its bearing face and at its lower end to the arms of said hanger means and being free at its upper end, said arms being substantially rigid but adapted to permit relative tilting movement between the shoe and hanger means, and a second bearing shoe on the opposite side of the piston and between said bosses, said second shoe being mounted on its inner side and interiorly of its bearing face and at its upper end and being free at its lower end, and spring means between the free ends of the shoes and the hangers for exerting outward pressure against said free ends of the shoes.

12. In a piston, a head, hanger means depending from said head and including shoe-supporting arms, piston pin bosses carried by said hanger means, a bearing shoe on one side of said piston and between said bosses, said bearing shoe being mounted at its lower end to the arms of said hanger means and being free at its upper end, said arms being substantially rigid but adapted to permit relative tilting movement between the shoe and hanger means, and a second bearing shoe on the opposite side of the piston and between said bosses, said second shoe being mounted at its upper end and being free at its lower end, means having holes between the free ends of said shoes and the hangers, and spring sleeves mounted in said holes exerting outward spring pressure against the free ends of the shoes, the sleeves having frictional engagement with the surfaces surrounding the hole to afford a snubbing action.

13. In a piston, a head, hanger means depending from said head, a bearing shoe integrally connected at one end to said hanger means and free at its opposite end, means between the free end of said shoe and said hanger means and having a hole, a spring sleeve mounted in said hole for exerting outward pressure against the free end of the shoe and having frictional engagement with the surface forming the hole, and a second spring sleeve mounted within said first mentioned spring sleeve and having frictional engagement with said first mentioned spring sleeve.

14. In a piston, a head, means depending from the head, bearing shoes on oppposite sides of said piston, one of said shoes being connected at its lower end to said means with its upper end free, the other shoe being connected at its upper end to the said means with its lower end free, means within the piston having holes adjacent the free ends of the shoes, nested spring sleeves mounted in the holes for exerting outward pressure against the free ends of the shoes and the being in frictional engagement with the surface sleeves for each shoe being in frictional engagement with each other and one of the sleeves forming the hole.

MACY O. TEETOR.

CERTIFICATE OF CORRECTION.

Patent No. 2,210,310. August 6, 1940.

MACY O. TEETOR.

It is hereby certified that error appears in the printed specification of the above numbered patent requiring correction as follows: Page 3, second column, line 29, claim 8, for "spring" read --springs--; page 4, second column, line 18, claim 14, strike out the words "being in frictional engagement with the surface" and insert the same after "sleeves" in line 20, same claim; and that the said Letters Patent should be read with this correction therein that the same may conform to the record of the case in the Patent Office.

Signed and sealed this 24th day of September, A. D. 1940.

(Seal)

Henry Van Arsdale,
Acting Commissioner of Patents.